Jan. 19, 1954  H. J. COLLINS  2,666,360
STEREOSCOPIC VIEWER
Filed Aug. 20, 1951  2 Sheets-Sheet 1

INVENTOR.
HARRY J. COLLINS
BY
Christian R. Nielsen
ATTORNEY.

Jan. 19, 1954     H. J. COLLINS     2,666,360
STEREOSCOPIC VIEWER
Filed Aug. 20, 1951     2 Sheets-Sheet 2
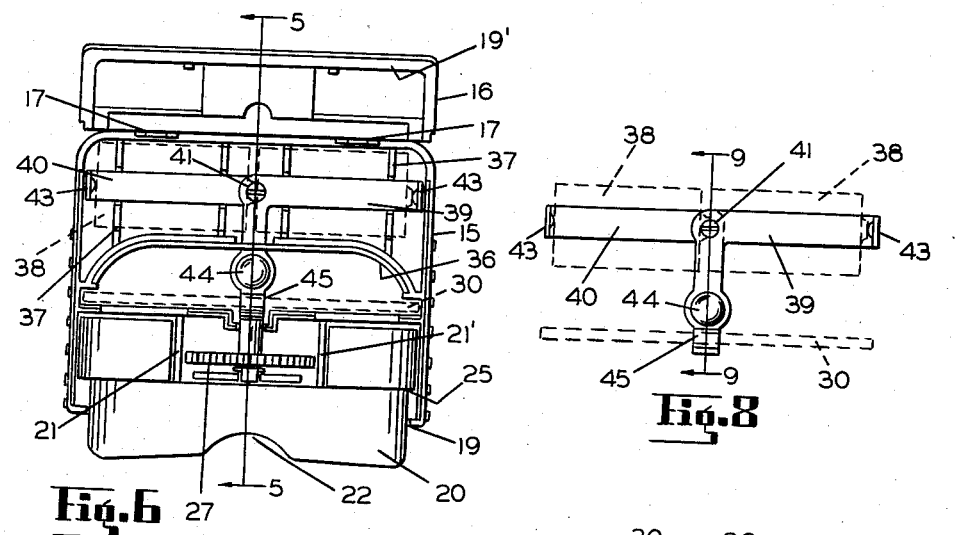
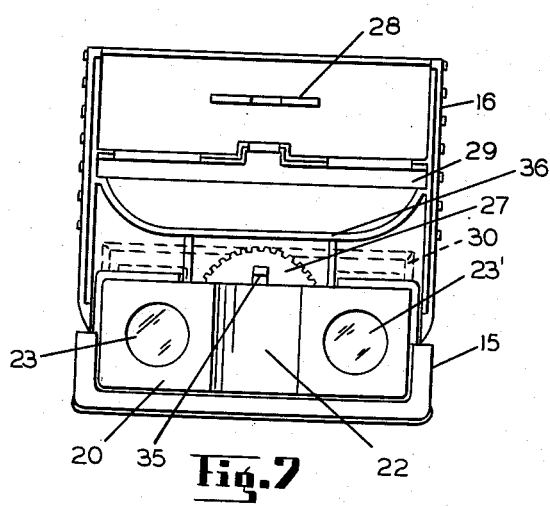
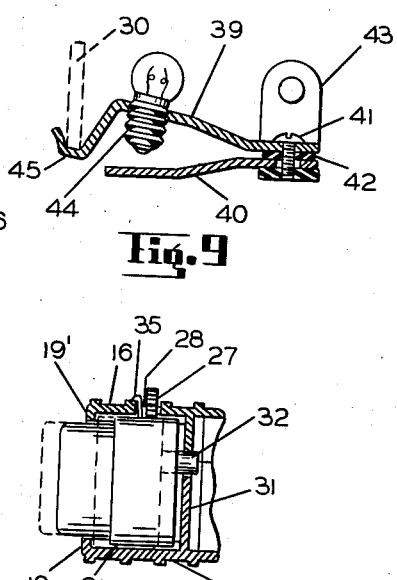
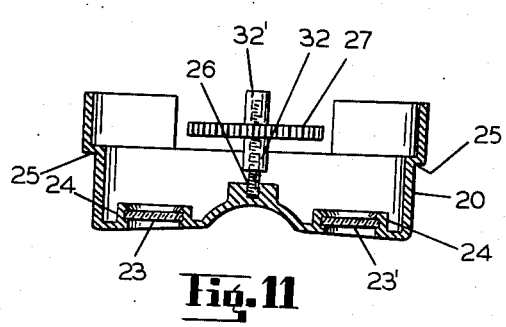
INVENTOR.
HARRY J. COLLINS
BY
Christian R. Nielsen
ATTORNEY.

Patented Jan. 19, 1954

2,666,360

UNITED STATES PATENT OFFICE 2,666,360

STEREOSCOPIC VIEWER

Harry J. Collins, Milwaukee, Wis., assignor to David White Company, Milwaukee, Wis., a corporation of Wisconsin Application August 20, 1951, Serial No. 242,652

3 Claims. (Cl. 88—29)

My invention relates to slide viewers and particularly to stereoscopic slide views.

An object of my invention is to provide a low cost slide viewer.

Another object of my invention is to provide a viewer that is equipped with a simple, inexpensive, yet positive bulb mounting and switch arrangement.

A further object of my invention is to provide a stereoscopic viewer that consists of a sturdy, compact, hinged enclosure retained in a closed position and easily brought to an open position.

A still further object of my invention is to provide a stereoscopic viewer that is constructed in a manner to permit guiding and limiting the movement of the carriage supporting the lenses, and retaining the carriage in engagement with the body of the enclosure by means of a cover arrangement.

Still another object of my invention is to provide a viewer in which the slide itself actuates the switch arrangement for the illumination of the slide.

Other objects and advantages will be pointed out in, or be apparent from, the specification and claims, as will obvious modifications of the single embodiment shown in the drawings, in which:

Figure 6 is a top or plan view of the assembled device in an open position.

Figure 7 is a front view of the device with the cover portion in a raised position.

Figure 8 is a detailed top view of the battery support and switch arrangement showing the batteries or dry cells and the stereoscopic slide in phantom.

Figure 9 is a fragmentary cross-sectional view of the arrangement shown in Figure 8, taken at the line 9—9 in Figure 8.

Figure 10 is a fragmentary cross-sectional view of the forward section of the container with the lens carriage in position, and Figure 11 is a horizontal cross-sectional view of the lens carriage illustrating the adjustment means.

Figure 1:
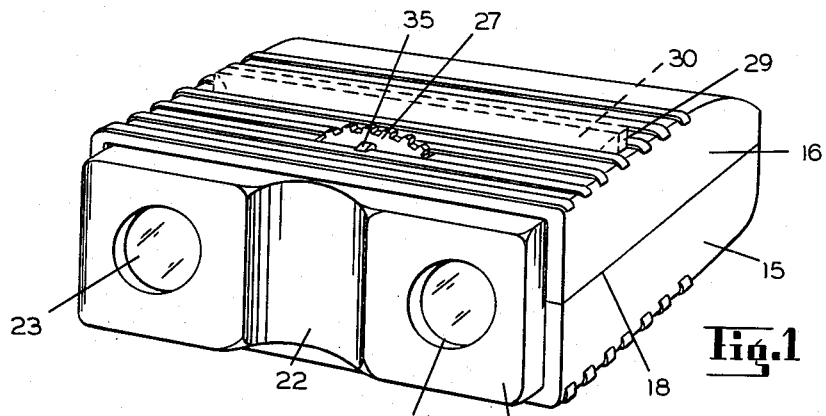
Figure 1 is a perspective view of the entire assembled device in a closed position.
Figure 2:
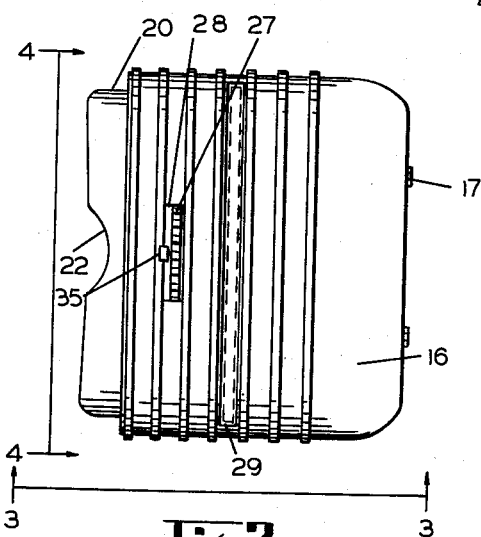
Figure 2 is a top or plan view of the assembled device as shown in Figure 1.
Figure 3:
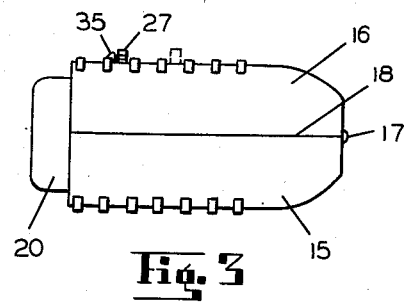
Figure 3 is a side elevation of the device as shown in Figure 1 taken from the line 3—3 in Figure 2.
Figure 4:
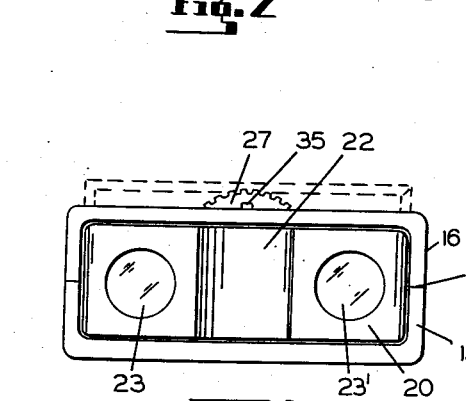
Figure 4 is a front view of the device as shown in Figure 1 taken from the line 4—4 in Figure 2.

The viewer has a body including bottom 15 and a cover 16 hingedly attached to it by means of hinges 17 at the rearward end of the body. The cover 16 and bottom 15 are brought into engagement with one another at 18 and are provided with inwardly extending flange members 19 and 19' at the open front end of the body for slidably retaining lens carriage 20 within the body.

The lens carriage 20 is shown slidably mounted on guide members 21 and 21' projecting upwardly inside the bottom of the body. This lens carriage 20 is recessed at its central portion 22 to receive the nose bridge of the person using the viewer and supports two lenses 23 and 23' in mountings 24 forming a part of the front face of the lens carriage 20. The carriage 20 is shouldered at 25 to contact flanges 19, 19' on the body to limit movement of the carriage out of the body.

Figure 5:
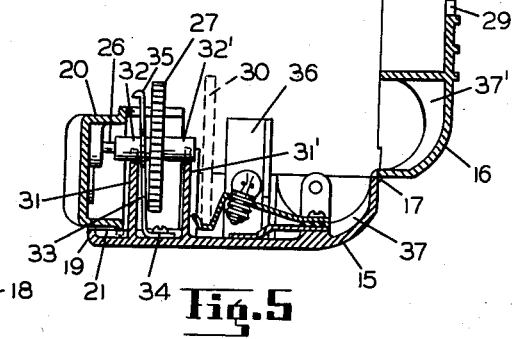
Figure 5 is a fragmentary, longitudinal, cross-sectional view of the assembled device taken at the line 5—5 in Figure 6.

The lens carriage 20 is further provided with a non-rotatable threaded stud 26. A knurled focusing knob 27 is threaded at its center to fit the threaded portion of the stud 26 and projects through slot 28 in the top of the body. The body is provided with two upwardly extending bearing supports 31 and 31' (Figure 5) for the outwardly extending hub portions 32 and 32' of the actuating member 27. There is also an upwardly extending latch 35 which is attached to the inside of the bottom 15 and projects through slot 28 forwardly of knob 27 to engage cover 16 and keep the cover in engagement with the bottom of the body. The latch may be easily disengaged to afford access to the interior of the body.

The viewer body 15 is provided with an upwardly extending reflector 36. This reflector extends across the body and its outer ends are curved to obtain uniform illumination of the reflector surface.

The rear portion of the body 15 has upwardly extending members shown as 37 and the similar members 37' registering in direct alignment with the members 37 are disposed downward within the cover portion 16 of the enclosure. Both of these members are semi-circular in contour and are arranged to receive dry cells 38 (shown in phantom in Figure 8) and retain them in position when the body is closed.

On the bottom of the body 15, are shown a pair of contact members 39 and 40, held in a fixed position by means of a screw 41. These contact members are insulated from one another by the insulated portion 42 (Figure 9). Both the contact members 39 and 40 have upwardly extending members 43 which make contact with the ends of the dry cells 38 when in position as shown in Figure 8. The one contact member 40 is mounted to provide a contact with the bottom of the lamp 44 which threadedly engages the upper contact 39 having a recessed portion 45 for supporting the stereoscopic slide 30 when it is placed into position in the elongated slot 29 in the cover 16 of the enclosure. As the stereoscopic slide 30 is moved downward, the upper contact member 39 is forced downward and permits contact of the base of lamp 44 with the lower contact member 40 thereby completing the electric circuit through the bulb to illuminate the reflector 38.

Thus, to operate the viewer, it is only necessary to insert the slide 30 into the elongated slot 29 in the cover 16, thereby engaging it with the upper contact 39 and forcing it downward so that the lamp 44 makes contact with the lower contact 40 to complete the circuit. Rotation of the focusing knob 27 on non-rotatable threaded stud 26 forming a part of the lens carriage 20 moves the lens carriage with respect to the slide to adjust the focus.

It will be appreciated that the bulb and switch arrangement for actuation by the slide may be applied to viewers other than stereoscopic viewers. Other uses will occur to those in the art and modifications of the present structure will also occur. Therefore the scope of the invention is to be determined only by the scope of the claims.

Having thus described my invention, what I claim and desire to secure by Letters Patent of the United States is:

I claim:

1. A stereoscopic viewer of the character described to be used in combination with a light bulb and batteries, said viewer comprising an enclosure open at its forward end and including upper and lower members attached to one another, a lens carriage, a pair of lenses mounted within the forward wall of said carriage, means mounted within said enclosure for slidably moving said lens carriage within the open end of said enclosure, a reflector disposed within said enclosure, an elongated slot extending laterally through the upper member forward from said reflector, a pair of resilient contact members insulated from one another and attached to the inner wall of said enclosure, one of said contact members extending above the other at their engaging ends, both of said contact members having their other end extending upward for contact with said batteries, the upper of said contact members provided with an aperture therethrough for supporting said light bulb at a position forward from said reflector, and an outwardly extending end on the upper contact member forward from said lamp bulb in alignment with the elongated slot through the upper member, the base of the lamp bulb extending through the upper contact member to contact the lower member when a slide is inserted through the elongated slot and forced downward to move the outward extending end of the upper contact member toward the lower contact member.

2. A stereoscopic viewer of the character described equipped with illuminating means, said viewer consisting of an enclosure open at one end, said enclosure comprising an upper and lower half, a lens carriage for supporting a pair of lenses, means for slidably moving said lens carriage within said enclosure in and out of the open end thereof, a vertical reflector laterally disposed within said enclosure, an elongated slot in the upper half of said enclosure, said slot located forwardly of said reflector, a pair of vertically spaced resilient contacts insulated from each other, one of said contact means provided with an aperture for receiving a lamp bulb, a portion of the upper contact member extending forward from said lamp bulb, said portion extending below said elongated slot whereby the upper contact member is moved downward until the bottom of said lamp bulb makes contact with the other contact member when a stereoscopic slide is inserted into said slot.

3. A stereoscopic viewer to be used in conjunction with an illuminating means consisting of a lamp bulb and battery, said viewer comprising in combination, a body, said body being open at one end, a lens carriage, said lens carriage having a pair of lenses disposed within its forward wall, means for slidably moving said carriage within said body in an out of the open end thereof, a vertical reflector extending laterally within said enclosure, an elongated slot through the upper half of said enclosure forward of said reflector, a pair of vertically spaced resilient contacts, insulated from one another the upper contact provided with an aperture for receiving a lamp bulb with the center contact of the bulb base facing the lower contact, a portion of said upper contact projecting forward from said lamp bulb to underlie said elongated slot thereby permitting the upper contact to be forced downward to bring the center contact of said lamp into engagement with said bottom contact when a stereoscopic slide is inserted through the elongated slot onto said portion of said upper contact.

HARRY J. COLLINS.

References Cited in the file of this patent

UNITED STATES PATENTS

| Number | Name | Date |
| --- | --- | --- |
| 1,850,903 | Tryon et al. | Mar. 22, 1932 |
| 1,989,803 | Hoben | Feb. 5, 1935 |
| 2,336,288 | Peterson | Dec. 7, 1943 |
| 2,394,225 | Ashford | Feb. 5, 1946 |
| 2,484,591 | Rochwite | Oct. 11, 1949 |

FOREIGN PATENTS

| Number | Country | Date |
| --- | --- | --- |
| 306,528 | Germany | June 28, 1918 |